(12) United States Patent
Capuozzo et al.

(10) Patent No.: US 9,590,818 B2
(45) Date of Patent: Mar. 7, 2017

(54) COMPUTER NETWORK, COMPUTER-IMPLEMENTED METHOD, COMPUTER PROGRAM PRODUCT, CLIENT, AND SERVER FOR NATURAL LANGUAGE-BASED CONTROL OF A DIGITAL NETWORK

(75) Inventors: Giuseppe Capuozzo, Rome (IT); Fabio Mammoliti, Santa Domenica Talao (IT); Daniele d'Errico, Rome (IT); Marco Borghini, Civitavecchia (IT)

(73) Assignee: Accenture Global Services Limited, Dubin (IE)

( * ) Notice: Subject to any disclaimer, the term of this patent is extended or adjusted under 35 U.S.C. 154(b) by 580 days.

(21) Appl. No.: 13/413,373

(22) Filed: Mar. 6, 2012

(65) Prior Publication Data

US 2012/0232886 A1    Sep. 13, 2012

(30) Foreign Application Priority Data

Mar. 7, 2011   (EP) .................................... 11425055

(51) Int. Cl.
   *G10L 15/22*      (2006.01)
   *G10L 25/63*      (2013.01)
   *H04L 12/28*      (2006.01)

(52) U.S. Cl.
   CPC .......... *H04L 12/2818* (2013.01); *G10L 15/22* (2013.01); *H04L 12/2814* (2013.01); *G08C 2201/31* (2013.01); *G10L 25/63* (2013.01); *G10L 2015/223* (2013.01); *G10L 2015/226* (2013.01); *H04L 2012/285* (2013.01)

(58) Field of Classification Search
   CPC ....... G10L 15/22; G10L 15/815; G10L 15/18; G10L 15/265; G10L 2015/226; G10L 25/63
   USPC ..................................... 704/9, 270.1
   See application file for complete search history.

(56) References Cited

U.S. PATENT DOCUMENTS

| | | | |
|---|---|---|---|
| 5,086,385 A | * | 2/1992 | Launey et al. ............. 700/83 |
| 6,198,479 B1 | | 3/2001 | Humpleman et al. |
| 6,731,307 B1 | * | 5/2004 | Strubbe et al. ............ 715/727 |
| 7,036,128 B1 | | 4/2006 | Julia et al. |

(Continued)

OTHER PUBLICATIONS

Extended European Search report corresponding to EP 11 425 055.8, mailed Sep. 30, 2011, 10 pages.

*Primary Examiner* — Angela A Armstrong
(74) *Attorney, Agent, or Firm* — Harrity & Harrity, LLP

(57) ABSTRACT

The present application relates to a computer network, a computer-implemented method, a computer program product, a client, and a server for natural language-based control of a digital network. In one aspect, the computer network for natural language-based control of a digital network may comprise: a digital network operable to provide sharing of access to a network between a plurality of devices connected in the digital network; a client installed in the digital network and operable to provide a unified natural language interface to a user to control the digital network using natural language; a server connected to the client over the network and operable to process a user request of the user performed through the unified natural language interface; and one or more software agents operable to execute at least one action on at least one of the plurality of devices based on the processed user request.

20 Claims, 5 Drawing Sheets

(56) References Cited

U.S. PATENT DOCUMENTS

| | | | |
|---|---|---|---|
| 7,499,860 B2* | 3/2009 | Baumert | G10L 15/26 704/270 |
| 2004/0100492 A1 | 5/2004 | Mercs | |
| 2007/0033005 A1* | 2/2007 | Cristo et al. | 704/9 |
| 2007/0106497 A1* | 5/2007 | Ramsey et al. | 704/9 |
| 2009/0043404 A1 | 2/2009 | Moor et al. | |
| 2010/0004924 A1* | 1/2010 | Paez | 704/9 |
| 2010/0013761 A1* | 1/2010 | Birnbaum | G06F 1/1613 345/156 |
| 2010/0151889 A1* | 6/2010 | Chen | G06F 17/30976 455/466 |
| 2012/0022872 A1* | 1/2012 | Gruber et al. | 704/270.1 |

* cited by examiner

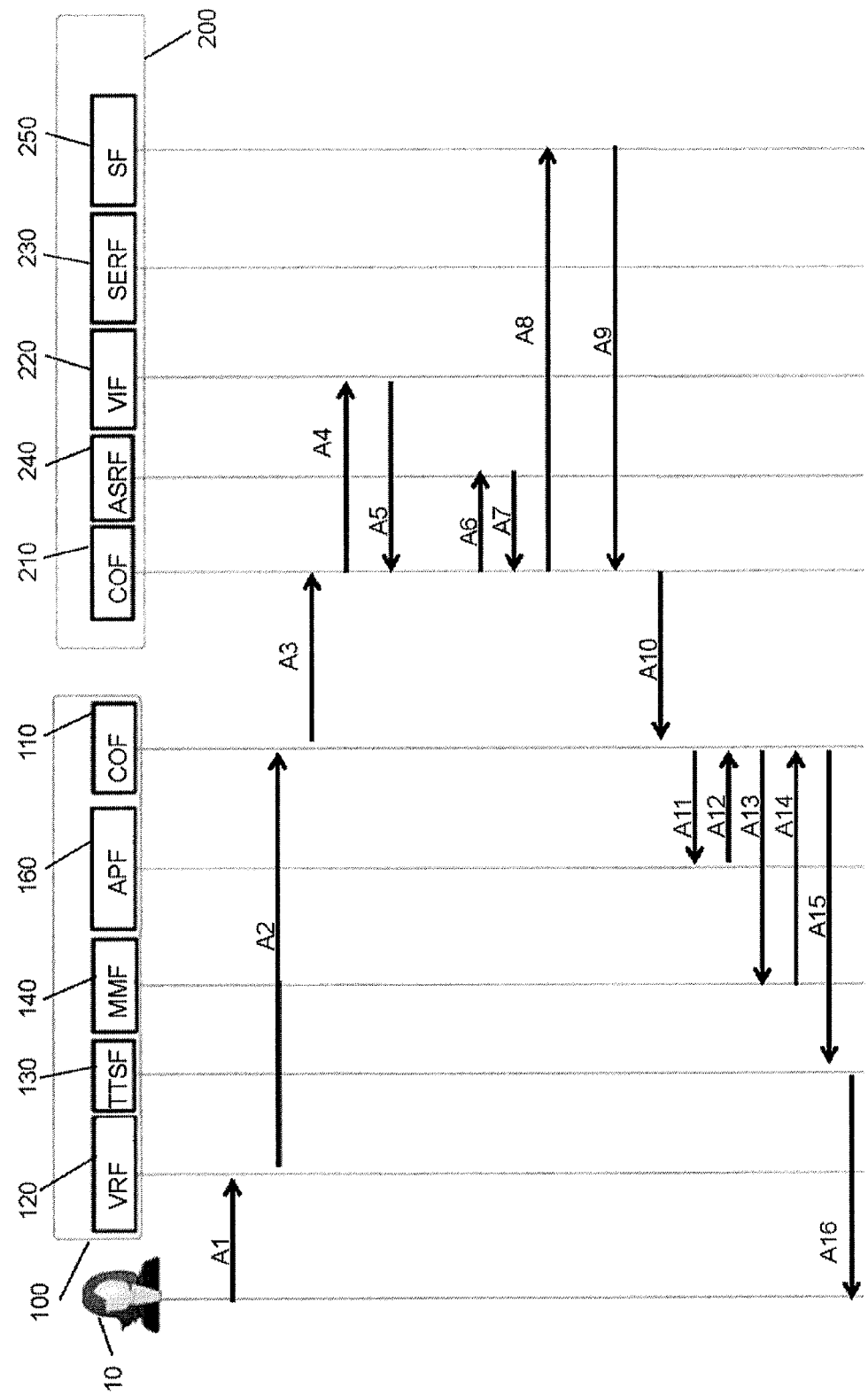

COMPUTER NETWORK, COMPUTER-IMPLEMENTED METHOD, COMPUTER PROGRAM PRODUCT, CLIENT, AND SERVER FOR NATURAL LANGUAGE-BASED CONTROL OF A DIGITAL NETWORK

CROSS REFERENCE TO RELATED APPLICATIONS

The present application claims priority to EP Patent Application No. 11 425 055.8, filed Mar. 7, 2011, in the European Patent Office. The contents of the prior application are expressly incorporated herein by reference in their entirety.

TECHNICAL FIELD

The description is directed generally to digital networks such as digitally connected homes or home networks and, in particular, to a computer network, a computer system, a computer-implemented method, and a computer program product for natural language-based control of a digital network.

BACKGROUND

Interaction with a plurality of electronic, electrical, and/or digital devices is constantly increasing. Digital networks such as home networks (also referred to as digital home networks or digitally connected homes) comprising a plurality of devices such as a personal computer, a notebook, a CD player, a DVD player, a Blu-ray Disc™ playback device, a sound system, a television, a telephone, a mobile phone, an MP3 player, a washing machine, a dryer, a dish washer, lamps, and/or a microwave, etc. are becoming more and more popular. Home networks may relate to complex ecosystems comprising a plurality of devices able to manage virtually any aspect of living such as home micro-climate, energy consumption, electrical appliances, multimedia content, home entertainment, heating and/or cooling systems, etc. Digital networks may also be present in other areas including offices, theaters, cars, museums, etc. In other words, digital networks may be present in any digitally-connected context where a man-machine interface may be applicable.

But such increasingly complex digital networks lack a unified and efficient way to be managed and/or controlled by users. Furthermore, digital networks require a user to learn and/or to interact with a plurality of different, often heterogeneous, user interfaces in order to satisfactorily interact with the different devices associated in a digital network.

Consequently, a need exists for improved man-machine interaction for users interacting with digital networks.

SUMMARY

According to a general aspect, a (framework for building) computer network(s) for natural language-based control of a digital network is provided. The network may comprise:
a digital network operable to provide sharing of access (or shared access) to a network between a plurality of devices connected in the digital network;
a client installed in the digital network and operable to provide a unified natural language interface to a user to control the digital network using natural language;
a server connected to the client over the network and operable to process a user request of the user performed through the unified natural language interface; and
one or more software agents operable to execute at least one action on at least one of the plurality of devices based on the processed user request.

The framework (or the built computer network) may allow different devices to be controlled by a unified natural language interface using an active and/or a passive mode. A user is able to perform a natural language request (referred to as a user request) to the client to control an action to be performed on a device in a digital network. Actions that can be controlled comprise, for example, turning on the light of a desk lamp in the user's room, running a washing cycle on a washing machine, programming a DVD player, setting the temperature for a heating system, etc.

Beyond understanding such explicit user requests, the framework may also be capable of extracting non-verbal information from the voice, e.g. the user's mood, and allow triggering a corresponding action performed by a software agent on one or more of the devices. For example, if a user is happy, a music player should be activated to play happy music, and/or if a user is talking about his last holidays, a home entertainment device should show pictures of said holidays.

The unified natural language interface may be provided by the client by implementing one or more components including a graphical user interface exposed to users in order to allow users to get some feedback from the network and/or manage and to configure the controlled devices. In order to reduce costs and/or to overcome limitations of a standalone device, the framework may be based on a client-server architecture including a modular approach for the client. For example, the client is operable to listen to a (natural language) user request. The client may then communicate with the server to interpret and/or to process the user request. The server may send the processed user request back to the client. The user-request may be processed resulting in a list of tags, e.g. a list of words extracted from a sentence (user request) which summarize the semantics of the sentence by omitting stop-words. Based on the processed user request received from the server, the client may select and perform action(s) to serve the user request. The client may perform the action(s) by triggering one or more software agents (also referred to as bundles) to perform the action(s) on one or more devices of the digital network.

The client may comprise a (substantially) complete knowledge of the devices, their capabilities, locations, and/or other relevant information. Said knowledge may be specified in a semantic lexicon. The semantic lexicon may comprise a semantic network describing the devices, their relationships and/or properties (e.g. actions which can be performed on them). The semantic lexicon may also and/or alternatively comprise a dictionary categorizing and/or classifying the devices of the digital network. The client may comprise knowledge including how to control the devices using a proper interface for notifying and subscribing the software agents that may perform the actions.

The server may receive voice samples generated from the user request from the client. The server may convert the voice samples to text and may extract relevant information so the client may identify the action to be taken to serve the user request. The relevant information may be sent back to the client as a list of tags comprised in a computer-readable format such as XML and/or any other suitable format. The list of tags may be used (by the client) to identify one or more actions and one or more corresponding devices needed in order to fulfill the user request.

In other words, when the network is operating, the client may sample a user's voice from a user request and then request the server to extract the relevant information from the user request in order to identify one or more target actions for one or more target devices to be performed by one or more software agents. The information comprised in a user request may be verbal (e.g. words, phrases, and/or sentences) and/or non-verbal (e.g. an emotion). Upon a user having selected an active or passive mode, the framework may process verbal and/or non-verbal information from a user request and may serve the user request accordingly.

A user may usually operate the network in the active mode by explicitly triggering the network (e.g. by keeping a soft-button on the GUI pressed while uttering a request). When the computer network is in passive mode, the network continuously listens to the user, thus producing a continuous flow of tags summarizing the topic the user is speaking about and his emotion.

It may also be possible for the user to operate the network in a mixed mode in which both user's explicit request and user's emotion are processed in order to decide the action to take.

Since a centralized server may provide most of the computing power required, the client may run on top of devices normally found in the user's home network (e.g. an Access Gateway, a set-top box, etc.).

The client may also provide an interface (a module management component) to a software agent (or bundle) interested in acting on behalf of a user request. The software agents, in turn, may control any kind of devices in the digital network.

According to another aspect, the client may comprise a module management component operable to provide an interface to the one or more software agents for publishing one or more actions offered by the one or more software agents to the client.

According to yet another aspect, the client may comprise a graphical user interface (GUI) exposed to the user for specifying user-defined settings of actions to be executed by the plurality of software agents on at least one of the plurality of devices, and/or selecting the operation mode (active and/or passive).

According to yet another aspect, the module management component may be further operable to export a set of functions to the one or more software agents to allow the one or more software agents to access the GUI.

According to yet another aspect, the client may comprise a home knowledge component comprising a semantic lexicon, wherein the semantic lexicon specifies information about the plurality devices in the digital network relevant to control the plurality of devices.

According to yet another aspect, the semantic lexicon may comprise device classes for the plurality of devices, relationships between the device classes and/or between the plurality of devices, and properties of the device classes and/or of the plurality of devices.

According to yet another aspect, the server may be operable to process the user request to a list of tags which is usable by the client to trigger the plurality of software agents to execute the at least one action on the least one of the plurality of devices.

According to yet another aspect, the server may be operable to process the user request by interpreting verbal information and/or non-verbal information extracted from the user request.

According to another general aspect, a client for natural language-based control of a digital network is provided. The client may comprise:
  a unified natural language interface operable to receive a user request for controlling a digital network using natural language, wherein the digital network is operable to provide sharing of access to a network between a plurality of devices connected in the digital network; and
  a module management component operable to provide an interface to one or more software agents for publishing one or more actions offered by the one or more software agents to the client (and/or subscribe to the client to be notified when, in passive mode, an emotion is detected), wherein the one or more software agents are operable to execute at least one action on at least one of the plurality of devices based on the user request,
  wherein the client is installed in the digital network.

According to yet another general aspect, a server for natural language-based control of a digital network is provided. The server may comprise:
  an interface operable to process a user request received from a client,
  wherein the user request is performed through a unified natural language interface for controlling a digital network using natural language at the client, wherein the digital network is operable to provide sharing of access to a network between a plurality of devices connected in the digital network, and
  wherein the user request is processed resulting in a list of tags which is usable by the client to trigger a plurality of software agents to execute at least one action on at least one of the plurality of devices based on the processed user request.

According to yet another aspect, the client and the server may comprise functionality and/or components of the computer network as described.

According to yet another general aspect, a computer-implemented method for natural language-based control of a digital network is provided. The method may comprise:
  providing, at a client, a unified natural language interface to a user to control a digital network using natural language, wherein the digital network is operable to provide sharing of access to a network between a plurality of devices connected in the digital network;
  sending a user request of a user performed through the unified natural language interface to a server, wherein the server is connected to the client over the network and operable to process the user request; and
  triggering one or more software agents to execute at least one action on at least one of the plurality of devices based on the processed user request.

According to yet another aspect, the computer-implemented method may comprise functionality and/or processing instructions to execute in a computer network as described.

In yet another general aspect there is provided a computer-program product comprising computer readable instructions, which when loaded and run in a computer system and/or computer network system, cause the computer system and/or the computer network system to perform a method as described.

The subject matter described in this specification can be implemented as a method or as a system or using computer program products, tangibly embodied in information carriers, such as a CD-ROM, a DVD-ROM, a semiconductor memory, signal and/or data stream, and a hard disk. Such computer program products may cause a data processing apparatus to conduct one or more operations described in this specification.

In addition, the subject matter described in this specification can also be implemented as a system including a processor and a memory coupled to the processor. The memory may encode one or more programs that cause the processor to perform one or more of the method acts described in this specification. Further, the subject matter described in this specification can be implemented using various MRI machines.

Details of one or more implementations are set forth in the accompanying exemplary drawings and exemplary description below. Other features will be apparent from the description and drawings, and from the claims.

BRIEF DESCRIPTION OF THE DRAWINGS

The accompanying drawings, which are incorporated in and constitute a part of this specification, illustrate various embodiments of the invention and, together with the description, serve to explain the principles of the invention. In the drawings:

FIG. 3A shows an exemplary flow diagram of interactions in the framework when operating in an active mode.

TECHNICAL TERMS

Figure 1:
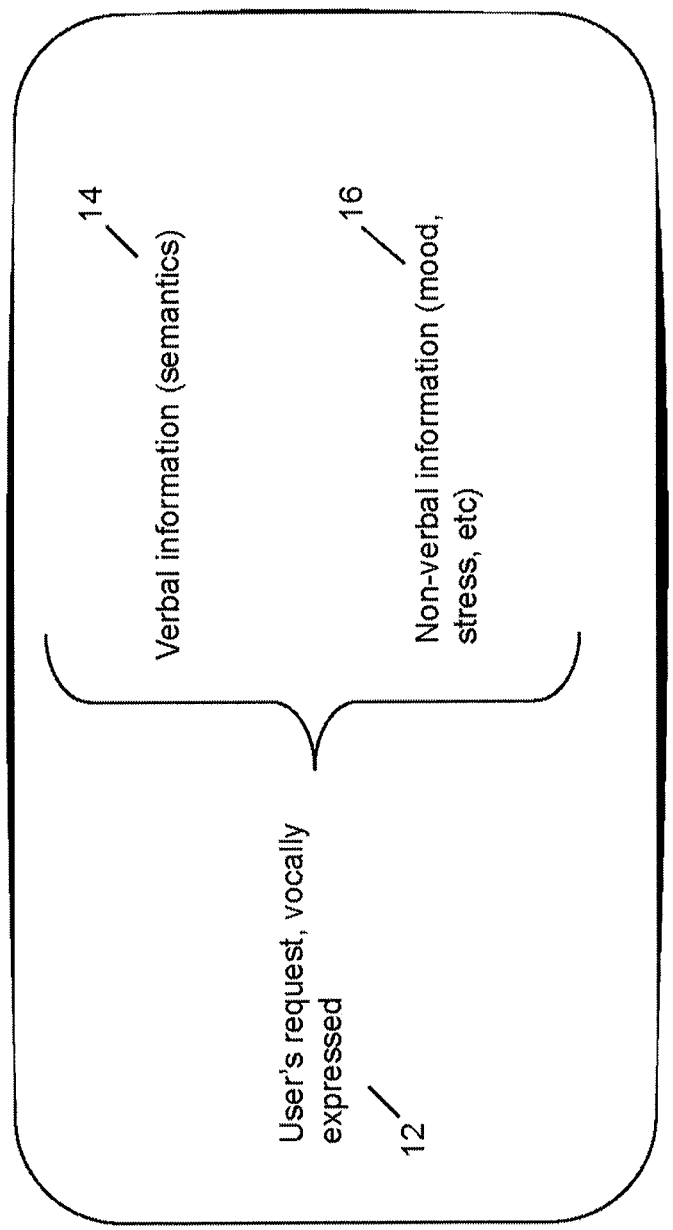
FIG. 1 shows an exemplary schematic illustration of informative content extractable from a user request formulated using natural language.

The following technical terms are widely used throughout the description. The terms may refer to but are not limited to the subsequently given explanations.

Home Network

A home network (also referred to as a home area network or a digitally connected home) may be an example of a digital network. A home network may be based on a residential local area network (LAN). The home network may be used for communication and/or interaction between digital devices comprising a personal computer, a notebook, a CD player, a DVD player, a Blu-ray Disc™ playback device, a sound system, a television, a telephone, a mobile phone, an MP3 player, a washing machine, a dryer, a dish washer, lamps, and/or a microwave, etc. A home network may enable one or more of the digital devices connected in the home network to access the Internet, for example a broadband service through a cable television and/or a digital subscriber line (DSL) provider. A home server may be added to the home network for increased functionality. Home networks may use wired or wireless communication technologies.

Speech Recognition

Speech recognition (also referred to as automatic speech recognition or computer speech recognition) may provide a mechanism to convert spoken words to text. Additionally, speech recognition may also comprise systems (referred to as a speaker recognition system) which need to be trained to recognize a particular voice of a particular speaker. Recognizing the voice of a particular speaker may ease and/or simplify the task of translating and/or converting spoken words to text. Various algorithms of speech recognition may be available. Acoustic modeling and/or language modeling may be used in statistically-based speech recognition algorithms. Examples of speech recognition algorithms may comprise Hidden Markov models (HMMs). The HMMs may relate to statistical models which may output a sequence of symbols and/or quantities. HMMs may be used in speech recognition since a speech signal can be considered as a short-time (e.g. 10 milliseconds) stationary signal. In a short-time, speech may be approximated as a stationary process. In speech recognition, the Hidden Markov model may output a sequence of n-dimensional real-valued vectors (with n being a small integer, such as 10), outputting one of these every 10 milliseconds. The vectors would consist of cepstral coefficients, which are obtained by taking a Fourier transformation of a short time window of speech and decorrelating the spectrum using a cosine transform, then taking the first (most significant) coefficients. The Hidden Markov model will tend to have in each state a statistical distribution that is a mixture of diagonal covariance Gaussians which will give a likelihood for each observed vector. Each word, or (for more general speech recognition systems), each phoneme, may comprise a different output distribution. A Hidden Markov model for a sequence of words and/or phonemes may be built by concatenating the individual trained hidden Markov models for the separate words and phonemes.

Speech recognition systems use various combinations of a number of standard techniques in order to improve results over the approach as described above. A large-vocabulary system might need context dependency for the phonemes (so phonemes with different left and right context have different realizations as HMM states). The system may also use cepstral normalization to normalize for different speaker and recording conditions. For further speaker normalization, a speech recognition system may use vocal tract length normalization (VTLN) for male-female normalization and/or maximum likelihood linear regression (MLLR) for more general speaker adaptation. A speech recognition system may also use so-called discriminative training techniques which dispense with a purely statistical approach to HMM parameter estimation and instead optimize some classification-related measure of the training data. Examples are maximum mutual information (MMI), minimum classification error (MCE) and minimum phone error (MPE).

Decoding of the speech (the term for what happens when the system is presented with a new utterance and must compute the most likely source sentence) may comprise the Viterbi algorithm to find the best path, wherein a choice may be provided between dynamically creating a combination Hidden Markov model which includes both the acoustic and language model information, or combining it statically beforehand (the finite state transducer approach).

Emotion Recognition in Voice

Emotion recognition solutions may depend on which emotions a machine should recognize and for what purpose. Emotions which may be considered may comprise for example sadness, boredom, surprise, happiness, anger, neutral and/or other known emotions, etc. Automatic emotion recognition of speech may be based on a pattern recognition problem. Results produced by different experiments with emotion recognition may be characterized by the features that are believed to be related with the speaker's emotional state, a type of emotion of interest to the system, a database for training and/or testing a used classifier, and/or a type of identifier used in the experiments, wherein the classifier and/or the type of identifier relate to a type of emotion used in an experiment to test a emotion recognition pattern of a voice. Emotion recognition in voice may be based on algorithms used in artificial intelligence for different purposes including determining a level of similarity such as neutral networks, supporting vector machines, supporting k-nearest neighbors, and/or supporting decision trees.

Speech Synthesis

Speech synthesis may relate to artificial production of human speech. A computer system used for this purpose may be referred to as a speech synthesizer such as a text-to-speech system. A text-to-speech system may convert normal language text into speech. Other systems may render symbolic linguistic representations such as phonetic transcriptions into speech. Synthesized speech may be created by concatenating pieces of recorded speech that may be stored in a database. Systems may differ in the size of the stored speech units. For example, a system that stores phones or diphones may provide a large output range, but may lack clarity. For specific usage domains, the storage of entire words or sentences may allow for a high-quality output. A synthesizer may incorporate a model of the vocal tract and/or other human voice characteristics to create a completely "synthetic" voice output.

Stop Words

In computing, in particular, computation linguistics comprising approaches to speech recognition and/or speech synthesis, stop words may be words that are filtered out by a search machine/natural language processing system prior to and/or after processing of natural language data (e.g., text, voice, and/or speech). Stop words may be defined in a possibly non-definite list. Any word of a natural language may be chosen as a stop word. In some natural language processing systems, a purpose for using the system may help determine the stop word. Examples of stop words include the, is, at, and, which, that, to, but, and other similar words. Other known natural language processing systems may, depending on their informative content, remove stop words such as want, may, would, etc. from natural language data in order to improve performance.

Semantic Network

A semantic network may relate to a network which may represent semantic relations among natural language concepts (e.g. a bear is a mammal which, in turn, is an animal). Semantic networks may be used in a form of knowledge representation such as an ontology. A semantic network may be implemented by a directed or undirected graph comprising vertices and edges between vertices. The vertices may represent concepts and the edges may represent relationships between the concepts. An example of a semantic network may be WordNet, a lexical database of English words. WordNet may group words (concepts) into sets of synonyms, may provide short, general definitions to each word, and/or may record one or more semantic relations between said sets of synonyms.

Semantic Lexicon

A semantic lexicon may relate to a dictionary of words labeled with semantic classes so that associations between words may be derived that may not have been previously been encountered. A semantic lexicon may comprise a dictionary and/or a lexicon associated with a semantic network.

Software Agent

A software agent may relate to a concept widely used in computation. A software agent may relate to a specific concept of software which may provide a convenient and/or powerful way to describe a (possibly complex) software entity or piece of software that may be capable of acting with a certain degree of autonomy in order to accomplish tasks on behalf of users and/or other software/hardware components. In other words, software agents may relate to a piece of software that acts for a user and/or another component in a relationship of agency, i.e. an agreement to act on one's behalf. Such action 'on behalf of' may imply the authority to decide which (and if an) action may be appropriate. Software agents may not only be invoked for a task but may activate themselves. Software Agents may be implemented as 'bundles', which may be independent pieces of software which connect to the client through a standard interface exposed by the client itself.

DETAILED DESCRIPTION

In the following, a detailed description of examples will be given with reference to the drawings. It should be understood that various modifications to the examples may be made. In particular, elements of one example may be combined and used in other examples to form new examples.

To improve man-machine interaction with digital networks and thus to relieve users from cumbersome and/or time consuming tasks (hence also mental tasks) of learning to use different, often heterogeneous and/or complex, user interfaces to satisfactorily interact with a digital network, a framework for unified natural verbal and/or non-verbal interaction with a digital network which may enable substantially any (digital) device to be controlled by a unified natural language user interface is provided. By providing a unified natural language interface, a user may not have to learn and/or understand an interface. In addition to understanding explicit (verbal) requests of a user, a unified natural language interface implemented according to the framework is also capable of extracting non-verbal information from the voice of a user speaking within the realm of the framework and to react appropriately based on the extracted non-verbal information. Non-verbal information of a user's voice may comprise different types of emotion, such as sadness, boredom, happiness, anger, surprise, neutral, or other emotion.

The framework may expose to one or more software agents (also referred to as bundles) a further interface, which may be based on a subscribe-notify model. This model is described further below. The software agents are operable to control the devices to perform specific actions (e.g., turning on/off a light, running a washing cycle on a washing machine, controlling a heating system to provide a certain temperature at a specific time, and other actions associated with the devices). In this manner, a user may interact with one unified natural language interface to operate and control all of the devices in the digital network.

In order to reduce costs and/or to overcome limitations of standalone devices and/or components, the framework for implementing a unified natural language interface for users to uniformly instruct devices in a digital network may be implemented based on a client-server architecture. A centralized server may provide most of the required computing power. But one of ordinary skill in the art will appreciate that a plurality of co-located or geographically dispersed servers may be used. A client or client software may run on top of devices usually available in a digital network. For example, the client may run on top of an access gateway (or a media gateway), a network-attached storage (NAS), a set-top box (STB), etc.

FIG. 1 relates to a schematic representation of information content which can be extracted from a user's voice and/or speech by a unified natural language interface. By interacting with a digital network through a unified natural language interface, a user formulates a request against the digital network using natural language 12. For example, the user formulates a natural language-based user request 12 "please turn on the desk lamp in my room". In the following, a user request refers to a request of a user against the framework, wherein the user request is formulated using a natural language (e.g. German, English, Italian, French, etc.).

The unified natural language interface is operable to gather explicit information, such as verbal information 14, including semantics of a sentence formulated by a user from the user request 12. For example, the unified natural language interface may derive from the sentence "please turn on the desk lamp in my room" semantics including who is the user, which room is meant, which is the indicated device, and/or the action to be performed on the determined device (e.g. that the desk lamp in the determined room shall be turned on).

The unified natural language interface may also be operable to gather implicit information such as non-verbal information 16 including a user's emotion (e.g., whether the user is stressed, happy, angry, surprised, sad, neutral) from the user request 12. For example, the unified natural language interface may derive from the sentence "please turn on the desk lamp in my room" not only the above mentioned semantics, but also whether the user expresses the sentence in a happy mood or in an angry mood, for example.

Based on whether verbal information 14 and/or non-verbal information 16 are extracted from a user request 12 during an interaction with the unified natural language interface, the framework exposing the unified natural language interface to the user may operate in two different corresponding modes. The mode that operates based on verbal information 14 may be referred to as an active mode. The mode that operates based on non-verbal information 16 (and possibly also on verbal information 14) may be referred to as a passive mode.

When operated in the active mode, a user explicitly operates the unified natural language interface, e.g. by pressing a push button on a GUI and speaking a user request 12. The unified natural language interface is operable to understand and/or interpret verbal information 14 from the user request 12. Based on the verbal information 14, the framework is operable to trigger a software agent (or bundle) that controls at least one device identified in the user request 12, e.g. the desk lamp in the determined room, and issue a corresponding command to the software agent to execute the user request 12, e.g. turning the light of the desk lamp in the determined room on.

When operated in the passive mode, the unified natural language interface is operable to continuously listen to a user speaking and to extract non-verbal information 16 and/or verbal information 14 from the user request 12. The extracted information may be processed and forwarded to one or more bundles which have been subscribed to the passive mode. The one or more bundles may then perform one or more actions corresponding to the extracted information by controlling one or more corresponding devices. For example, if a user is talking with a friend about his last holidays in a happy mood, a corresponding bundle may operate a device for playing appropriate multimedia content and/or may adapt an environment to the user's mood. Actions to be taken based on non-verbal information 16 may have been selected and/or defined by the user himself via a GUI.

Figure 2:
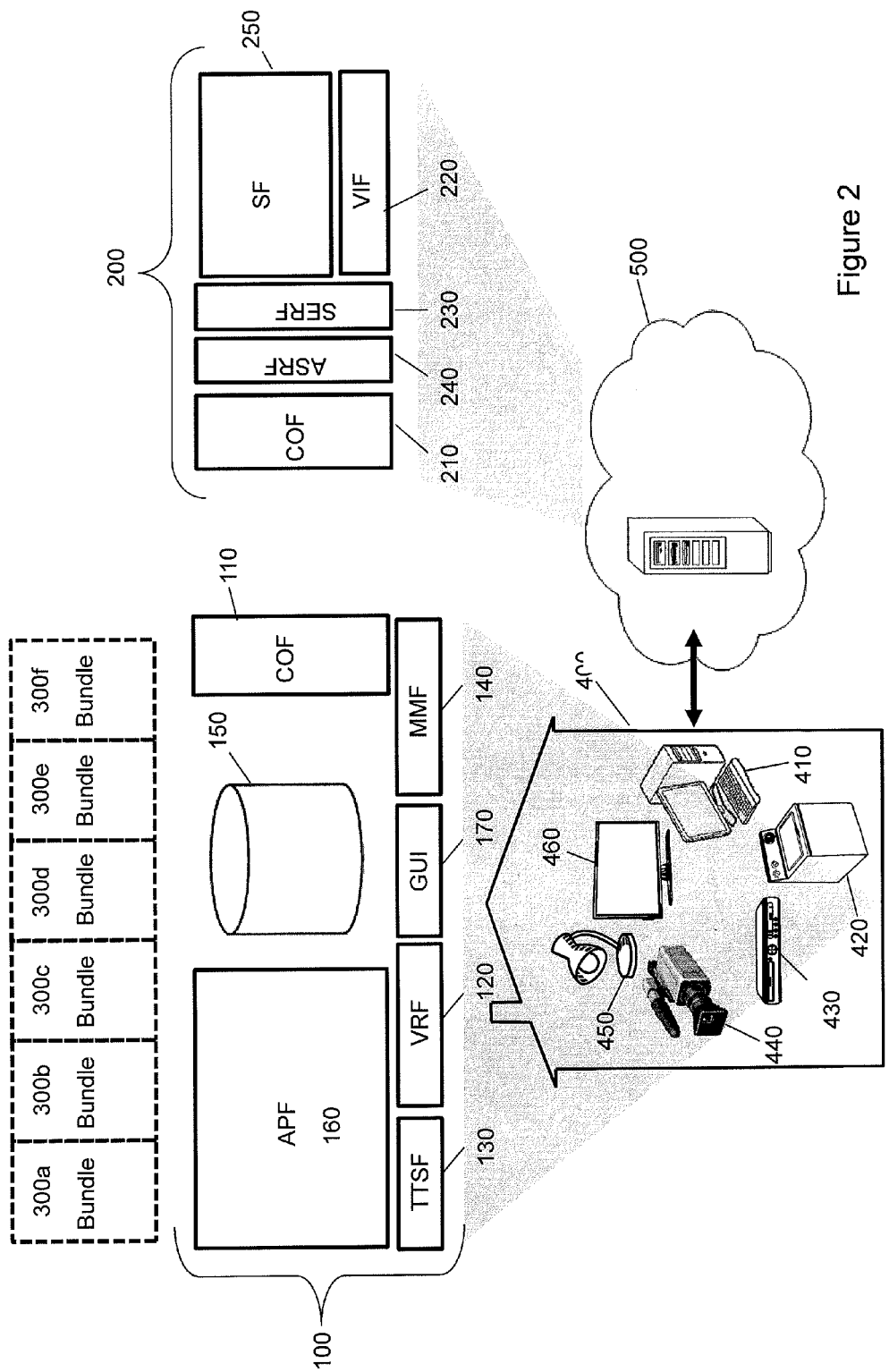
FIG. 2 shows an exemplary framework architecture of a system for providing natural language control of a digital network.

FIG. 2 shows an exemplary framework architecture for implementing a computer network, a client, a server, and a computer-implemented method for controlling a digital network such as a home network using natural language. In other words, the framework may provide an architecture for implementing natural-language based control of a digital network, wherein a user can interact with the digital network through a unified natural language interface.

The framework comprises a client 100, which is located in a user's environment of a digital network 400 to be controlled. To control the digital network 400 by formulating natural language user requests (referred to herein after as user requests) the client 100 provides a unified natural language interface to users. The unified natural language interface comprises one or more components 110, 120, 130, 140, 150, 160, and 170. For example, the client 100 may be implemented as client software that may run on top of devices usually available in the digital network 400. For example, the client 100 may run on top of an access gateway (or a media gateway), a network-attached storage (NAS), a set-top box (STB), etc.

The framework may manage one or more bundles 300a, 300b, 300c, 300d, 300e, 300f. Each of the bundles 300a, 300b, 300c, 300d, 300e, 300f may control at least one device 410, 420, 430, 440, 450, 460 connected in the digital network 400. Examples of the devices 410, 420, 430, 440, 450, 460 may comprise a personal computer, a CD/DVD/Blu-ray Disc™ playback device, a television set, a video camera and/or a web cam, a washing machine, a dish washer, a heating and/or cooling system, lamps, etc. The digital network 400 is connected to a network 500 such as the Internet. In other words, the digital network 400 may provide sharing of Internet 500 access between the digital devices 410, 420, 430, 440, 450, 460, for example by using a broadband service through a cable television and/or a digital subscriber line (DSL) provider. A home server may be added to the digital network for increased functionality.

The framework comprises a server 200. The server 200 is operable to interact with the client 100 and to process user requests received at the client 100. The server 200 may be located remote from the client 100 and may communicate with the client over the network 500.

The client 100 comprises one or more components 110, 120, 130, 140, 150, 160, and 170 for interaction with a user such as for processing a user request and/or for enabling user-defined settings of the one or more bundles 300a, 300b, 300c, 300d, 300e, 300f. The components 110, 120, 130, 140, 150, 160, and 170 may also be referred to as functions. The one or more components 110, 120, 130, 140, 150, 160, and 170 comprise a communication and orchestration component 110, a voice recording component 120, a text-to-speech component 130, a module management component 140, a home knowledge component 150, an action planning component 160, and/or a graphical user interface (GUI) 170.

The communication and orchestration component 110 of the client 110 holds and/or provides computation and/or communication logic for the client 100. The communication and orchestration component 110 may be implemented as an information bus which is used internally by the client 100 to exchange data and/or information between one or more components 120, 130, 140, 150, 160, and 170 operating within the client 100. The communication and orchestration component 110 provides functionality for communication and/or interaction of the client 100 with the server 200. In other words, the communication and orchestration component 110 provides the client 100 with an interface for communication with the server 200 over the network 500. As explained in greater detail below, the server 200 comprises a corresponding communication and orchestration component 210 which provides a corresponding interface for communication with the client 100 over the network 500.

The voice recording component 120 of the client 100 is operable to receive incoming speech of a user from a user request and to sample the user's voice of the user request. The one or more voice samples are formatted and/or digitized in order to be sent to the server 200 across the network 500. Formatted voice samples may be represented and/or stored in terms of signal sequences such as speech signals or acoustic signals. The voice samples relate to a partition and/or a separation of the user request into samples, e.g. words, syllables, and/or phonemes. In order to format and/or digitize the voice samples into a speech signal, the voice samples of the user having performed the user request may be compared to samples stored in a database in order to identify them, e.g. by using pattern matching and/or a similarity search. The identified samples are then composed into a speech signal. In order to improve the matching of the samples, the voice recording component 120 may previously identify the user having performed the user request and/or the user identifies himself against the client 100 so that the search in the database can be restricted to samples stored in association with the user.

The text-to-speech component 130 of the client 100 is operable to give the user having previously performed a user request a vocal feedback. In one exemplary implementation, the text-to-speech component 130 may be implemented by using an available speech synthesis system.

The module management component 140 of the client 100 may provide a single point of contact for the one or more bundles 300*a*, 300*b*, 300*c*, 300*d*, 300*e*, 300*f* which interacts with the framework to control the devices 410, 420, 430, 440, 450, 460. The module management component 140 exposes an interface to the bundles 300*a*, 300*b*, 300*c*, 300*d*, 300*e*, 300*f* to publish their services (or actions) to the client 100. A user may configure the bundles 300*a*, 300*b*, 300*c*, 300*d*, 300*e*, 300*f* by specifying user-defined settings for actions to be performed by the bundles 300*a*, 300*b*, 300*c*, 300*d*, 300*e*, 300*f* through the interface. Configuration of the bundles 300*a*, 300*b*, 300*c*, 300*d*, 300*e*, 300*f* is described in further detail below. The interface for configuring the bundles 300*a*, 300*b*, 300*c*, 300*d*, 300*e*, 300*f* may be exposed to users through the graphical user interface (GUI) 170 of the client 100. The module management component 140 may provide the bundles 300*a*, 300*b*, 300*c*, 300*d*, 300*e*, 300*f* access to the GUI so that the bundles 300*a*, 300*b*, 300*c*, 300*d*, 300*e*, 300*f* may retrieve the user-defined settings (or configurations).

The home knowledge component 150 of the client 100 provides and/or stores information necessary for the client 100 to function. The home knowledge component 150 may comprise information about the one or more devices 410, 420, 430, 440, 450, 460 of the digital network 400 which is managed and/or controlled through the client 100. Said information about the devices 410, 420, 430, 440, 450, 460 may comprise time and/or resource capabilities, required electrical and/or electronic connections, and/or other information about the devices 410, 420, 430, 440, 450, 460 which might be relevant to control and/or manage the devices 410, 420, 430, 440, 450, 460. Examples include a physical location in the digital network 400, a category and/or a class a device belongs to (e.g. a desk light is a lamp which is part of a lightening system) and/or actions which can be performed on the device (e.g. a lamp can be turned on or off and/or dimmed). In one implementation, the home knowledge component 150 comprises a semantic lexicon comprising a semantic network and/or a dictionary describing the devices 410, 420, 430, 440, 450, 460 in the network 400, including device categories, relationships between them, and/or properties in terms of actions of the devices 410, 420, 430, 440, 450, 460. The home knowledge component 150 may comprise information about user-defined settings for the bundles 300*a*, 300*b*, 300*c*, 300*d*, 300*e*, 300*f*. The user-defined settings may specify behavior of the bundles 300*a*, 300*b*, 300*c*, 300*d*, 300*e*, 300*f* including actions to be taken by the bundles 300*a*, 300*b*, 300*c*, 300*d*, 300*e*, 300*f* with regard to the active mode and/or to the passive mode. For example, a user has specified that if he is in happy mood, then a bundle 300*a*, 300*b*, 300*c*, 300*d*, 300*e*, 300*f* controls an entertainment device of the network 400 to play happy music.

The action planning component 160 of the client 100 implements functionality to generate a command to instruct at least one target bundle 300*a* of the bundles 300*a*, 300*b*, 300*c*, 300*d*, 300*e*, 300*f* to control a specific action performed by a corresponding device 410, 420, 430, 440, 450, 460 upon a user request and a corresponding output from the server 200 having processed the user request.

The client 100 exposes the graphical user interface (GUI) 170 for user-interaction with the client 100 and/or the bundles 300*a*, 300*b*, 300*c*, 300*d*, 300*e*, 300*f* which provides the user with the ability to interact with the client 100 and/or to configure the bundles 300*a*, 300*b*, 300*c*, 300*d*, 300*e*, 300*f* by specifying user-defined settings. The GUI 170 provides one or more user controls (not shown) including a mode selection control, an active request control, a device control, a bundle action control, and/or a user recognition control for users.

The mode selection control provides control for selecting an operation mode, e.g. for selecting the active mode or the passive mode.

The active request control provides control for explicitly issuing a user request when the client 100 is in the active mode. Because in the active mode the client 100 may not continuously listen to a user speaking, activating the active request control (e.g. by pressing a button) explicitly instructs the client 100 when to listen to the currently speaking user to determine a user request.

The device control enables a user to interactively edit information to be stored in the home knowledge component 150. For example, the user provides the client 100 with information about the one or more devices 410, 420, 430, 440, 450, 460, of the digital network 400 which may not be inferred automatically by the client 100 from the devices 410, 420, 430, 440, 450, 460 and this information is stored in the home knowledge component 150. For example, information about a physical location of a device 410, 420, 430, 440, 450, 460 in the home of the user may not be automatically inferred by the client 100; whereas, information about resource and/or time capabilities of the devices 410, 420, 430, 440, 450, 460 may be automatically derived by the client 100.

The bundle action control enables a user to interactively specify one or more actions to be taken by the bundles 300*a*, 300*b*, 300*c*, 300*d*, 300*e*, 300*f*. Actions may be specified with regard to verbal information such as specific content categories filtered and/or extracted from a user request, and/or with regard to non-verbal information such as a user's emotion extracted from a user's speech. When the network is operated in passive mode, actions may be specified by the user in terms of condition action rules. A condition action rule allows for associating a condition (such as, but not limited to, a detected emotion or a detected topic) with an action for controlling and/or operating a device. In one example, a user may specify that a device controlled through at least one bundle 300a, 300b, 300c, 300d, 300e, 300f in the network to play happy music (action) when the user is in a happy mood (condition), e.g., a corresponding bundle 300a, 300b, 300c, 300d, 300e, 300f may activate a corresponding entertainment device of the digital network 400 and control it to selectively play happy music. In another example, the user may specify that pictures (and not related video) be shown (action) when a user talks about a specific topic (condition), e.g., a corresponding bundle 300a, 300b, 300c, 300d, 300e, 300f may activate a corresponding entertainment device of the digital network 400 to selectively show pictures relating to the discussed topic. User settings performed through the bundle action control may be connected to and/or may reside in the bundles 300a, 300b, 300c, 300d, 300e, 300f. For this purpose, the client 100 exposes an interface to the bundles 300a, 300b, 300c, 300d, 300e, 300f through the module management component 140 to allow the bundles 300a, 300b, 300c, 300d, 300e, 300f to access the GUI 170. In other words, the framework may also comprise an interface for the bundles 300a, 300b, 300c, 300d, 300e, 300f to expose through the GUI 170 to the user.

The user recognition control provides user control to improve understanding of speech recognition and/or speaker recognition in the framework. For example, a user having installed a client 100 connected to a server 200 for controlling his digital network 400 may identify himself to the client 100 and train the framework using the user recognition control. For example, the framework can be trained by a user by speaking predefined words and/or phrases. Form the spoken predefined words and/or phrases, voice samples of the user may be generated in the framework. The voice samples can be sent to the server 200 in order to extract the corresponding voice prints of users having trained the client 100 and/or to store said voice prints for a future use.

A voice print may relate to a set of measurable characteristics of a human voice that may uniquely identify an individual. Said characteristics may be based on the physical configuration of a speaker's mouth and/or throat and may be expressed as mathematical formula. A voice print may therefore comprise a voice sample recorded for that purpose, the derived mathematical formula, and/or its graphical representation.

Speaker recognition (hence, recognizing who is speaking) may comprise the computing task of validating a user's claimed identity using characteristics extracted from user voices, such as a voice print of the user. Speaker recognition should be differentiated from speech recognition which relates to recognizing what is being said. Voice recognition may relate to a combination of speaker recognition and speech recognition, wherein a voice recognition system may use learned aspects of a speaker's voice to determine what is being said.

The server 200 comprises one or more components 210, 220, 230, 240, and 250 for processing user requests received from the client 100. When processing a user request, the server 200 is operable to summarize the incoming request into a list of one or more tags which comprises information taken from the user request sufficient to meet semantic content of the user request.

The server 200 exposes an interface to the client 100 through a communication and orchestration component 210. The interface hides complexity of translating voice samples of user requests into lists of tags. The lists of tags are then usable by the client 100 to trigger the bundles 300a, 300b, 300c, 300d, 300e, 300f to control a device 410, 420, 430, 440, 450, 460 in the digital network 400 in order to serve the user request. For example, the client 100 may trigger, based on the list of tags, one or more bundles 300a, 300b, 300c, 300d, 300e, 300f through one or more of the components 110, 120, 130, 140, 150,160, and 170 to perform at least one action on at least on of the devices 410, 420, 430, 440, 450, 460 to serve the user request. The list of tags generated at the server 200 may be further processed and/or enhanced with additional information at the client 100 in order to serve the user request.

In one implementation, the server 200 comprises a communication and orchestration component 210, a voice identification component 220, a speech emotion recognition component 230, an automatic speech recognition component 240, and/or a semantic component 250.

The communication and orchestration component 210 comprises computation and/or communication logic for the server 200. The communication and orchestration component 210 may be implemented as an information bus which is used internally by the server 200 to exchange data and/or information between one or more components 220, 230, 240, and 250 operating within the server 200. The communication and orchestration component 210 provides functionality for communication and/or interaction of the server 200 with the client 100.

The voice identification component 220 is operable to identify a user issuing a user request. To identify a user having issued a user request to the client 100, the voice identification component 220 processes incoming voice samples of the user request from the client 100 to extract one or more features from the voice samples to be matched against voice prints of users stored in an internal database. The matches may be performed by making similarity searches between the extracted features and the voice prints. In order to narrow the identification of the user to a smaller possible groups of users, the client 100 may send together with the voice samples a location information of the location of the client 100 and/or an identification of the user to the server 200. The voice prints of users may be received from the client 100 of users that are training better voice understanding through the user recognition control of the GUI 170 as described above.

In one exemplary implementation, the voice identification component 220 is implemented using an available speaker recognition system. For example, the voice identification component 220 may implement a speaker recognition system which records one or more features extracted from different users interacting with the framework in the form of voice prints (also referred to as templates or models). A speech sample or an utterance taken from the voice sample of a user is then compared against different voice prints stored in an internal database in order to determine a best match. In case the user has claimed an identity along with the user request and/or the client 100 has sent with the user request location information, the voice identification component 220 compares the speech sample of the generated voice sample of the user to a voice print associated with the user and/or the location of the client 100 in the database.

Output of the voice identification component 220 may be provided to the automatic speech recognition component 240 and/or to the semantic component 250 (e.g. as a user ID) in order to improve the output of the above 240 and 250 components. Having been provided with the speaker identification, the automatic speech recognition component 240 and the semantic component 250 may load speaker dependant set of parameters obtained from a previous training in order to maximize the hit probability for that user. Such parameters may comprise pitch, formants, MFCCs, etc., eventually obtained from training from the user. The semantic component 250 is operable to use the information about the user (e.g. the user ID) output by the voice identification component 200 and/or by the automatic speech recognition component 240 to correctly interpret the user request.

The speech emotion recognition component 230 is operable to analyze the voice of a user currently speaking when the passive mode is activated to extract non-verbal information including emotions such as mood, stress, anger, happiness, etc. from the user's voice. For example, to extract non-verbal information from the user's voice, the speech emotion recognition component 230 computes one or more spectrum features e.g. pitch, voice formant, MFCC, etc., eventually along with their deviance from a neutral case, from the voice samples of the user and then matches the computed spectrum features against a pre-built knowledge base of sample spectrum features regarding emotions in voice. In order to improve a matching to determine an emotion in the voice of a user having performed a user request, the user may train the framework similar as for the speech recognition through the user recognition control provided within the GUI 170. For example, a user may utter predefined words and/or phrases with different emotions. Voice samples are generated from the uttered predefined words and/or phrases and corresponding voice prints with emotions for the user may be generated similar to the voice prints as previously described.

In one implementation, the speech emotion recognition component 230 is implemented using an available emotion recognition system.

The automatic speech recognition component 240 is operable to receive voice samples sent by the client 100 to the server 200 and outputs a corresponding textual transcription. In one exemplary implementation, the automatic speech recognition component 240 is implemented using an available speech recognition system. The textual transcription of the voice samples of the user are input to the semantic component 250.

The semantic component 250 is operable to process the textual transcriptions of the user voice samples received from the automatic speech recognition component 240 by using additional information received from the voice identification component 220 and/or by using additional information received from the home knowledge component 150 of the client 100 to extract a list of one or more tags from the textual transcriptions of the user voice samples corresponding to the user request. The list of tags may summarize the semantics of the textual transcriptions of the user voice samples by omitting negligible information. Determination of the list of tags from the textual transcriptions of the user voice samples may be performed by using a user ID of the user having performed the user request as received from the voice identification component 220, a semantic network and/or a semantic lexicon, e.g. the semantic network provided by the home knowledge component 150 in combination with stop-word lists. For example, a user has formulated the user request "please turn on the desk lamp in my room" which was previously transformed to text at the automatic speech recognition component 240. Using a stop-word list and/or a semantic lexicon, the semantic component 250 generates a list of tags {room, desk lamp, turn on} from the initial user request processed as previously described.

The list of tags may be enhanced with further semantics to trigger a corresponding action at the semantic component 250 and/or at one or more components 110, 120, 130, 140, 150, 160, and 170 at the client 100 after receiving a response to the user request from the server 200. The response may comprise the list of tags, the user ID, and/or additional information. To trigger the one or more bundles 300*a*, 300*b*, 300*c*, 300*d*, 300*e*, 300*f* to perform the action of turning on the light of the desk lamp in the user's room, following further semantics may be determined at the client 100 and/or at the server 200. For example, the identified user is Sarah. From the semantic lexicon stored in the home knowledge component 150, it can be determined which room in the home organized in the digital network is Sarah's room and that a desk lamp is a lamp which is of category lighting system. Using the home knowledge component 150, it can be also determine which lamp of the lamps in Sarah's room is the desk lamp, because for example this characteristic may be described in the semantic lexicon of the home knowledge component 150. Furthermore, from the category the actions possible with lighting systems can be derived, e.g. turn on, turn of, and/or dim.

Software agents may be implemented as bundles 300*a*, 300*b*, 300*c*, 300*d*, 300*e*, 300*f*, that is independent piece of software which may interact with the client trough a standard interface exposed by the client itself and may interact with each. In the framework as shown in FIG. 2, the bundles 300*a*, 300*b*, 300*c*, 300*d*, 300*e*, 300*f* are implemented as software agents specialized in performing tasks requested by a user through the client 100 and/or in controlling one or more of the devices 410, 420, 430, 440, 450, 460 in the digital network 400. For example, one or more of the bundles 300*a*, 300*b*, 300*c*, 300*d*, 300*e*, 300*f* may be operable to perform one or more of the following exemplary tasks, e.g. by controlling one or more of the devices 410, 420, 430, 440, 450, 460: turning a light on or off, reading environment data, running a washing cycle on a washing machine, controlling a digital living network alliance (DLNA) device, etc.

The client 100 exposes a single point of contact through the module management component 140 to the bundles 300*a*, 300*b*, 300*c*, 300*d*, 300*e*, 300*f*. The bundles 300*a*, 300*b*, 300*c*, 300*d*, 300*e*, 300*f* may expose their offered services to the module management component 140. In other words, in one implementation the single point of contact is represented by the module management component 140. The module management component 140 exposes through the single point of contact a registration service, a subscription service, and/or a notification service to the bundles 300*a*, 300*b*, 300*c*, 300*d*, 300*e*, 300*f*.

During a registration phase, e.g. while a bundle 300*a*, 300*b*, 300*c*, 300*d*, 300*e*, 300*f* registers with the client 100 for providing its services to users, the bundle 300*a*, 300*b*, 300*c*, 300*d*, 300*e*, 300*f* notifies the client 100 using the registration service. The bundle 300*a*, 300*b*, 300*c*, 300*d*, 300*e*, 300*f* may notify the client 100 that it (the bundle 300*a*, 300*b*, 300*c*, 300*d*, 300*e*, 300*f*) is up and running, may export relevant information about itself such as its class, vendor, serial number and so on (the bundle 300*a*, 300*b*, 300*c*, 300*d*, 300*e*, 300*f*), and/or may provide its (of the bundle 300*a*, 300*b*, 300*c*, 300*d*, 300*e*, 300*f*) capabilities to the client 100. The capabilities of a bundle 300*a*, 300*b*, 300*c*, 300*d*, 300*e*, 300*f* may comprise one or more commands the bundle 300*a*, 300*b*, 300*c*, 300*d*, 300*e*, 300*f* is able to execute, e.g. turning a light of a lamp on/off, running a cycle of a washing machine, programming a DVD player, etc. Once the client 100 is aware of the bundle 300*a*, 300*b*, 300*c*, 300*d*, 300*e*, 300f, the client 100 may ask a user to provide additional information for the bundle 300a, 300b, 300c, 300d, 300e, 300f such as a physical location of the device 410, 420, 430, 440, 450, 460 controlled by the bundle 300a, 300b, 300c, 300d, 300e, 300f, a user associated with the device 410, 420, 430, 440, 450, 460, and/or possible actions which may be performed on the device 410, 420, 430, 440, 450, 460 by specifying corresponding commands for the bundle 300a, 300b, 300c, 300d, 300e, 300f to execute the actions, etc. The user may specify such additional information through the GUI 170, e.g. by interacting with the device control and/or the bundle action control. The user input may be stored with the bundle 300a, 300b, 300c, 300d, 300e, 300f and/or in the home knowledge component 150.

The previously registered bundle 300a, 300b, 300c, 300d, 300e, 300f subscribes to the client 100 through the subscription service. Having subscribed to the client 100, the bundle 300a, 300b, 300c, 300d, 300e, 300f may perform a request against the client 100 to process a list of tags received by the server 200 during processing of a user request and/or to identify a corresponding action to be taken by the bundle 300a, 300b, 300c, 300d, 300e, 300f. In case the bundle 300a, 300b, 300c, 300d, 300e, 300f performs an action in response to the user request, the client 100 notifies the bundle 300a, 300b, 300c, 300d, 300e, 300f with one or more commands to execute the corresponding action at the device 410, 420, 430, 440, 450, 460 controlled by the bundle 300a, 300b, 300c, 300d, 300e, 300f. The bundle 300a, 300b, 300c, 300d, 300e, 300f subscribed to the client 100 may perform a request to the client 100 to receive a list of tags in a data stream, in case the framework is operating in the passive mode. The bundle 300a, 300b, 300c, 300d, 300e, 300f is then responsible for executing one or more actions relating to the list of tags determined from a user request.

Depending on at least one service the bundle 300a, 300b, 300c, 300d, 300e, 300f has subscribed to at the client 100, a notification from the client 100, when executing the notification service, may comprise different information depending on the actual mode the framework is in: a command to execute in active mode or a list of detected emotion which will trigger the required action in passive mode. For example, the client 100 may notify the bundle 300a, 300b, 300c, 300d, 300e, 300f to execute a command determined from the list of tags generated from a user request. In another example, the client 100 may notify one or more bundles 300a, 300b, 300c, 300d, 300e, 300f about the list of tags received by the server 200 in response to processing a user request. Said notification is sent from the client 100 to the bundles 300a, 300b, 300c, 300d, 300e, 300f which may asked for new lists of tags periodically and/or every time new tags are received at the client 100 and notified to the bundles 300a, 300b, 300c, 300d, 300e, 300f.

In addition to the above described registration, subscription, and/or notification services of bundles 300a, 300b, 300c, 300d, 300e, 300f to the client 100, the bundles 300a, 300b, 300c, 300d, 300e, 300f may require further configurations to act appropriately in the framework on behalf of a user. For example, bundles 300a, 300b, 300c, 300d, 300e, 300f may change in their behavior, may require additional information from a user on how to perform an action in response to a user request. In order to enable user-based configuration of bundles 300a, 300b, 300c, 300d, 300e, 300f and/or, the module management component 140 of the client 100 exports a set of services to the bundles 300a, 300b, 300c, 300d, 300e, 300f to allow the bundles 300a, 300b, 300c, 300d, 300e, 300f to access to the GUI 170. As described above, the GUI 170 provides a user with functionality to configure a bundle 300a, 300b, 300c, 300d, 300e, 300f based on his personal needs. In this way, a development effort of the framework can be reduced so that an implementation of the framework is more efficient and flexible.

Figure 3B:
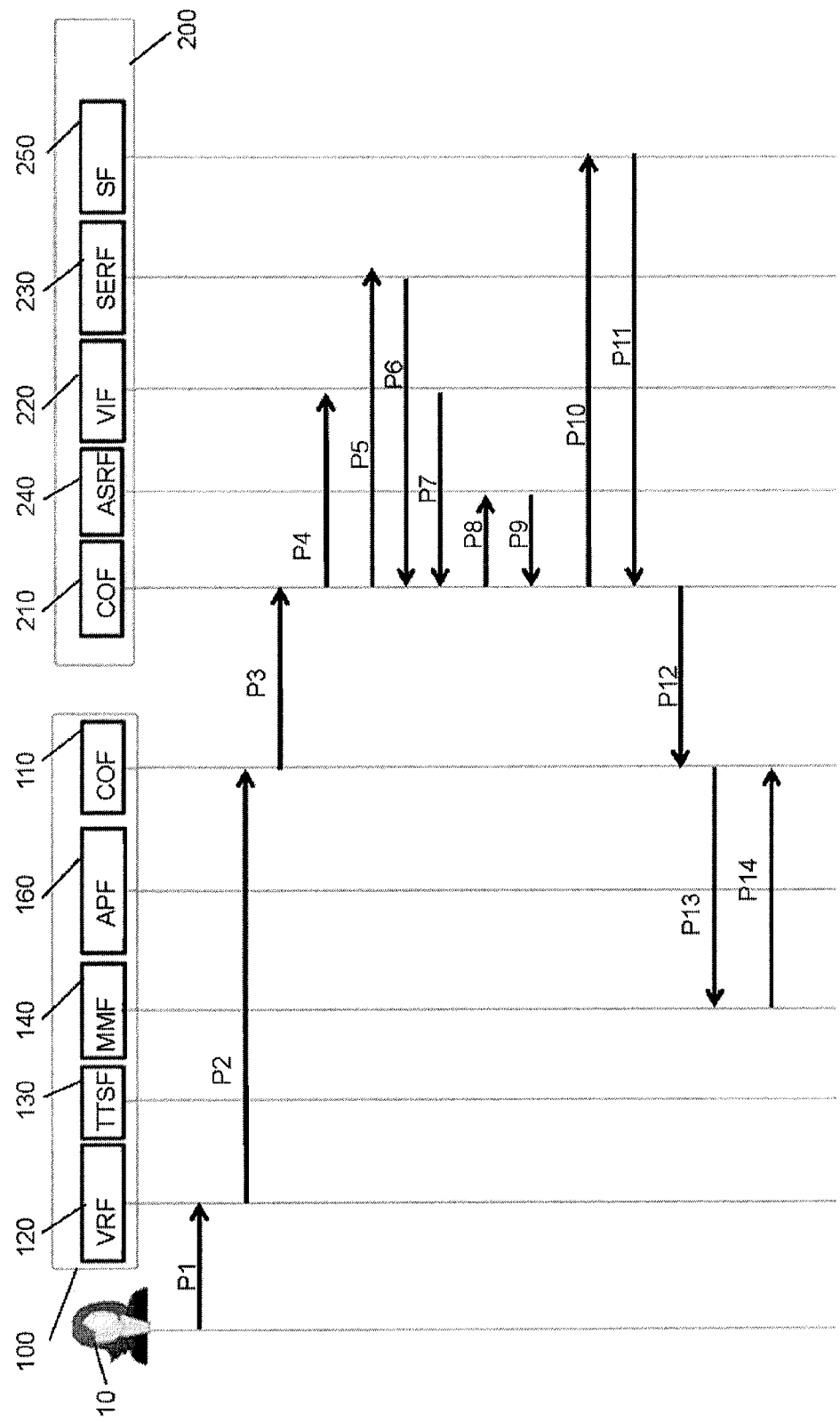
FIG. 3B shows an exemplary flow diagram of interactions in the framework when operating in a passive mode.

FIGS. 3A and 3B show exemplary interactions of a user with the framework described with reference to FIG. 2. It should be understood that the features and/or properties described with reference to the entities shown in FIG. 2 may also apply to the entities shown in FIGS. 3A and 3B, wherein same entities have the same reference numbers.

FIG. 3A shows an exemplary sequence of interactions performed in the framework of FIG. 2 when operating in the active mode.

A user 10 has chosen the active mode for the client 100 (and therefore for the framework) by selecting and activating the active mode from the mode selection control exposed through the GUI 170.

For example, the user 10 wants to request the client 100 to turn the light of the desk lamp on in his room. For this purpose, the user 10 accesses the GUI 170 of the client 100 and activates the active request control. When the active request control is activated, the user 10 performs a user request by speaking the following sentence "please turn on the desk lamp in my room". The voice of the user and the user request is recorded by the voice recording component 120, at A1. At A2, the voice recording component 120 samples the user request. The voice samples are formatted and digitized into a speech signal in order to be sent across the network 500 to the server 200 for further processing. The speech signal is sent to the communication and orchestration component 110. The communication and orchestration component 110 formats a request to the server 200 which comprises the speech signal, the voice samples of the user request generated at the voice recording component 120 and/or information about the user 10 and/or about a device 410, 420, 430, 440, 450, 460 addressed in the user request such as a unique device identifier, at A3. The voice samples and/or additional information to serve the user request are received at the communication and orchestration component 210 of the server 200.

The communication and orchestration component 210 provides the voice samples to the voice identification component 220, at A4. The voice identification component 220 identifies from the voice samples of the user 10 who has performed the request. After the user 10 is identified, the voice identification component 220 sends a corresponding user identity (user ID) to the communication and orchestration component 210, at A5. The communication and orchestration component 210 stores the user ID in association with the currently processed user request so that the user ID can be sent back to the client 100 when responding to said user request. The communication and orchestration component 210 sends the voice samples of the user 10 to the automatic speech recognition component 240, at A6. The communication and orchestration component 210 may additionally send the corresponding determined user ID of the user 10 to the automatic speech recognition component 240 in order to improve the performance of the automatic speech recognition component 240. Having received the voice samples, the automatic speech recognition component 240 translates the voice samples into text. For example, the automatic speech recognition component 240 may implement an available speech recognition system to convert the voice samples of the user 10 corresponding to the user request to text. In case the user ID of the user 10 is also received together with the voice samples at the automatic speech recognition component 240, a determination of possible syllable and/or word patterns matching the voice samples may be restricted with the regard to the user 10. Having transcribed the voice samples to text, the automatic speech recognition component 240 sends the generated text to the communication and orchestration component 210, at A7. The communication and orchestration component 210 may store the received text in association with the user request, the user ID, and/or the voice samples of the user request. The communication and orchestration component 210 sends the text generated from the user's 10 voice samples to the semantic component 250, at A8. The semantic component 250 processes the text to generate a list of one or more tags from the text. The semantic component 250 may generate the list of tags from the text by using and/or implementing a semantic lexicon, stop-word lists, and/or a semantic network by accessing the home knowledge component 150. For example, by removing stop-words from the user request translated to text as previously described, i.e. from "please turn on the desk lamp in my room"; by making semantic associations between used words (e.g. associate 'desk lamp' with 'lamp' which is a 'light'); and/or by deriving semantic relationships between words in the text, the semantic component 250 may generate the list of tags {"desk lamp", "turn_on", "room"} from the received text.

The semantic component 250 sends the generated list of tags to the communication and orchestration component 210 to format and/or generate a corresponding response to be sent to the client 100, at A9. The response may comprise the generated list of tags corresponding to the user request of the user 10, the user ID of the user 10, and/or additional information which may be required to instruct a bundle 300a, 300b, 300c, 300d, 300e, 300f to perform a corresponding action at one of the devices 410, 420 430, 440, 450, 460 in the digital network 400. The formatted response is send back to the communication and orchestration component 110 of the client 100 across the network 500, at A10.

The communication and orchestration component 110 sends the response to the action planning component 160, at A11. Based on the response, the action planning component 160 selects a target device 410, 420, 430, 440, 450, 460 in the digital network 400 and a corresponding action to be performed. For example, from the received response the action planning component 160 concludes that the user 10 is 'Sarah' according to the user ID. By inspecting the list of tags received with the response, the action planning component 160 determines, for example based on the term 'desk lamp' in the list of tags, the action planning component 160 concludes a class of a target device. The devices 410, 420, 430, 440, 450, 460 of the digital network 400 may be stored in a semantic network stored at the home knowledge component 150. Having determined a class of a target device, the action planning component 160 may determine from the word 'room' in the list of tags and the identifies user 10 'Sarah' a specific target device 410, 420, 430, 440, 450, 460 (i.e. the desk lamp in Sarah's room) in the digital network 400. From the word 'turn_on' in the list of tags, the action planning component 160 determines by accessing the home knowledge component 150 the corresponding action to be performed on the desk lamp in Sarah's room, namely to turn it on. Having determined the target device 410, 420, 430, 440, 450, 460 and the action to be performed on said device 410, 420, 430, 440, 450, 460, the action planning component 160 forwards a corresponding command (e.g. specifying the target device 410, 420, 430, 440, 450, 460, desk lamp in Sarah's room, and the action to be performed on said device 410, 420, 430, 440, 450, 460, namely to turn the device 410, 420, 430, 440, 450, 460 on) to the communication and orchestration component 110, at A12. The communication and orchestration component 110 sends the command to the module management component 140 which triggers the target bundle 300a, 300b, 300c, 300d, 300e, 300f which controls the determined target device 410, 420, 430, 440, 450, 460 to perform the requested action on the target device 410, 420, 430, 440, 450, 460, i.e. to turn light of the desk lamp in Sarah's room on, at A13. After having performed the instructed action, the module management component 140 returns a corresponding outcome of the taken action to the communication and orchestration component 110, at A14. For example, the module management component 140 returns the result of the action, i.e. that the light of the target device 410, 420, 430, 440, 450, 460 is turned on. The communication and orchestration component 110 provides a corresponding response to the text-to-speech component 130 which generated a vocal or speech output from the response, e.g. by using an available speech synthesis system, at A15. The vocal feedback is the played to the user 10, e.g. through a voice interface in the GUI 170, at A16.

FIG. 3B shows an exemplary sequence of interactions performed in the framework as shown in FIG. 2 when operating in the passive mode.

A user 10 has chosen the passive mode for the client 100 (and therefore for the framework) by selecting and activating the passive mode from the mode selection control exposed through the GUI 170.

At P1, the user 10 is speaking and his voice is recorded by the voice recording component 120. The voice recording component 120 samples the voice of the user 10 and digitizes the voice samples to a speech signal in order to be sent across the network 500 to the server 200 operating in the framework, at P2. The voice recording component 120 sends the voice samples of the speaking user 10 in the corresponding speech signal to the communication and orchestration component 110. The communication and orchestration component 110 formats a request for the server 200 which may comprise the voice samples in the speech signal generated at the voice recording component 120 and/or information about the user 10 and/or information about a device 410, 420, 430, 440, 450, 460 addressed in the user request such as a unique device identifier, at P3.

The communication and orchestration component 210 provides the voice samples received from the client 100 to the voice identification component 220, at P4. The voice identification component 220 identifies from the voice samples the user 10 who has performed the request and provides a corresponding user ID. The communication and orchestration component 210 provides the voice samples received from the client 100 to the speech emotion recognition component 230, at P5. The speech emotion recognition component 230 may implement an available emotion recognition system to determine an emotion of the user 10 from the received voice samples. For example, the speech emotion recognition component 230 may determine from the received voice samples of the user 10 that the user 10 is in a "happy" mood. At P6, the speech emotion recognition component 230 sends the emotion of the user 10, in the present example "happy", to the communication and orchestration component 210 which stores the emotion 'happy' of the user 10 in association with the currently processed user request and/or the user 10. At P7, the voice identification component 220 sends the determined user ID of the user 10 to the communication and orchestration component 210 which stores the user ID of the user 10 in association with the current user request and/or the user 10.

The communication and orchestration component 210 sends the voice samples of the user 10 to the automatic speech recognition component 240, at P8. The communication and orchestration component 210 may additionally send the corresponding determined user ID of the user 10 to the automatic speech recognition component 240 in order to improve the performance of the automatic speech recognition component 240. Having received the voice samples, the automatic speech recognition component 240 translates the voice samples into text. For example, the automatic speech recognition component 240 may implement an available speech recognition system to convert the voice samples of the user 10 corresponding to the current user request to text. In case the user ID of the user 10 is also received together with the voice samples at the automatic speech recognition component 240, a determination of possible syllable and/or word patterns matching the voice samples may be restricted with the regard to the user 10. Having transcribed the voice samples to text, the automatic speech recognition component 240 sends the generated text to the communication and orchestration component 210, at P9. The communication and orchestration component 210 may store the received text in association with the user request, the user ID, voice samples of the user request of the user 10, and/or the determined emotion "happiness" of the user 10. The communication and orchestration component 210 sends the text generated from the voice samples of the user request to the semantic component 250, at P10. The semantic component 250 processes the text to generate a list of one or more tags from the text. The semantic component 250 may generate the list of tags from the text by using and/or implementing a semantic lexicon, stop-word lists, and/or a semantic network and/or by accessing the home knowledge component 150. For example, by removing stop-words from the user request processed to the text as previously described, by making semantic associations between used words (e.g. associate 'Sardinia' with 'Italy' for e.g. the user 10 is talking with a friend about his holidays in Sardinia in the summer), and/or by deriving semantic relationships between words in the sentence, the semantic function may generate the list of tags {"holiday", "beach", "Sardinia"} from the received text. The semantic component 250 sends the generated list of tags to the communication and orchestration component 210 to format and/or generate a corresponding response to be sent to the client 100, at P11. The response may comprise the generated list of tags corresponding to the user request of the user 10, the user ID of the user 10, the determined mood of the user 10 (e.g. 'happy') and/or additional information which may be required to instruct a bundle 300a, 300b, 300c, 300d, 300e, 300f to perform a corresponding action through one of the devices 410, 420 430, 440, 450, 460 in the digital network 400. The formatted response is send back to the communication and orchestration component 110 of the client 100 across the network 500, at P12.

The communication and orchestration component 110 of the client 10 which has received the formatted response from the server 200 sends the list of tags, the determined user emotion, and/or the user ID to the module management component 140. The module management component triggers one or more bundles 300a, 300b, 300c, 300d, 300e, 300f which have subscribed to the corresponding service of reacting to one or more specified user emotions (e.g. to the emotion "happy"). The bundles 300a, 300b, 300c, 300d, 300e, 300f process the list of tags based on user-defined internal configurations. For example, the user may have configured one or more bundles 300a, 300b, 300c, 300d, 300e, 300f to control a computer device and/or a TV device from the devices 410, 420, 430, 440, 450, 460 of the digital network 400 to show pictures from the user's last holiday in Sardinia. Having triggered the corresponding bundles 300a, 300b, 300c, 300d, 300e, 300f, the module management component 140 gives a feedback of the performed action to the communication and orchestration component 110.

Figure 4:
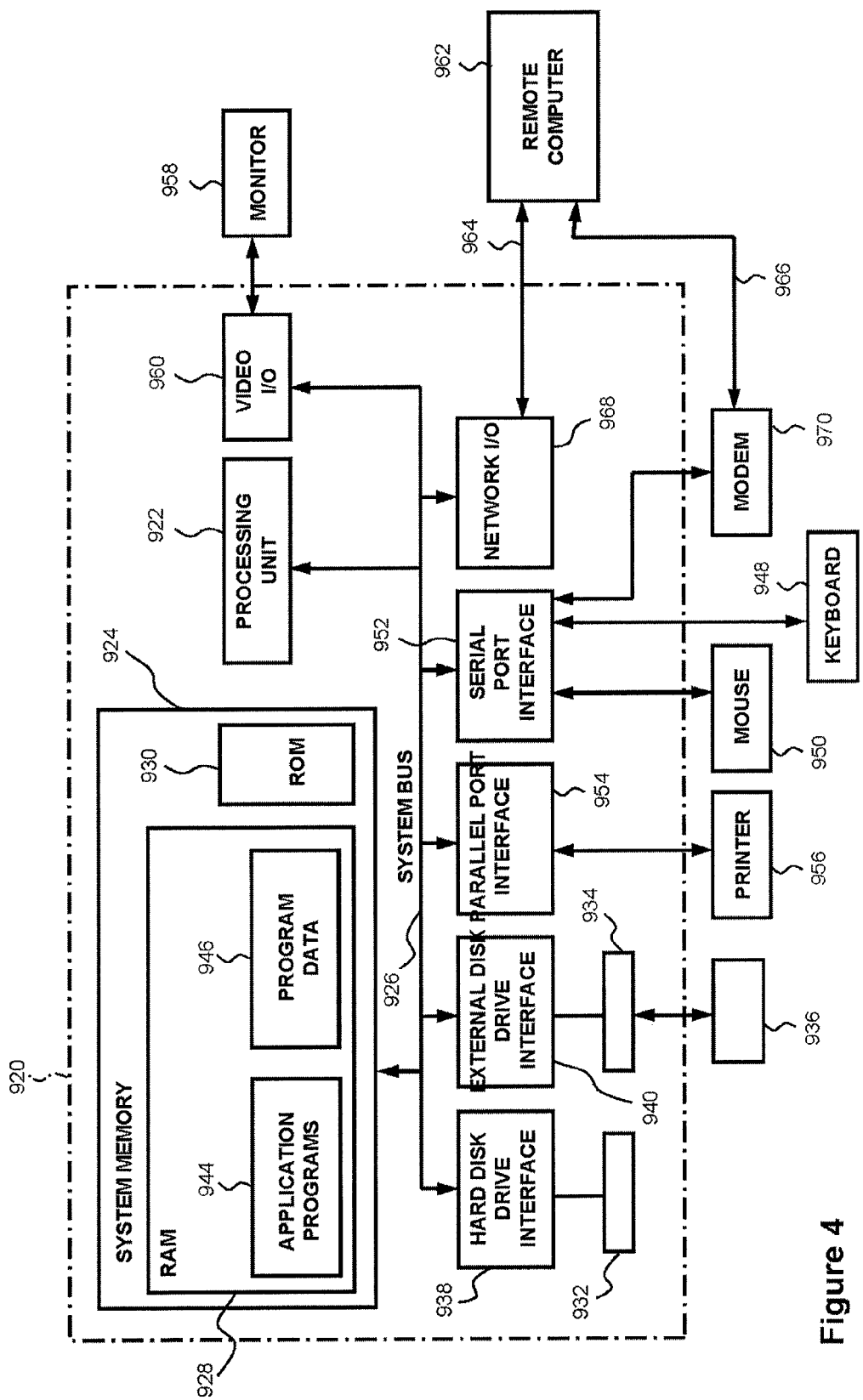
FIG. 4 relates to an exemplary computer system and/or computer network system for implementing a network, a method, a client, and a server as shown in FIGS. 1, 2, 3A and 3B.

FIG. 4 shows an exemplary system for implementing the invention including a general purpose computing device in the form of a conventional computing environment 920 (e.g. a personal computer). The conventional computing environment includes a processing unit 922, a system memory 924, and a system bus 926. The system bus couples various system components including the system memory 924 to the processing unit 922. The processing unit 922 may perform arithmetic, logic and/or control operations by accessing the system memory 924. The system memory 924 may store information and/or instructions for use in combination with the processing unit 922. The system memory 924 may include volatile and nonvolatile memory, such as a random access memory (RAM) 928 and a read only memory (ROM) 930. A basic input/output system (BIOS) containing the basic routines that helps to transfer information between elements within the personal computer 920, such as during start-up, may be stored in the ROM 930. The system bus 926 may be any of several types of bus structures including a memory bus or memory controller, a peripheral bus, and a local bus using any of a variety of bus architectures.

The personal computer 920 may further include a hard disk drive 932 for reading from and writing to a hard disk (not shown), and an external disk drive 934 for reading from or writing to a removable disk 936. The removable disk may be a magnetic disk for a magnetic disk driver or an optical disk such as a CD-ROM for an optical disk drive. The hard disk drive 932 and the external disk drive 934 are connected to the system bus 926 by a hard disk drive interface 938 and an external disk drive interface 940, respectively. The drives and their associated computer-readable media provide non-volatile storage of computer-readable instructions, data structures, program modules and other data for the personal computer 920. The data structures may include relevant data for the implementation of the method for natural language-based control of a digital network, as described above. The relevant data may be organized in a database, for example a relational database management system or a object-oriented database management system.

Although the exemplary environment described herein employs a hard disk (not shown) and an external disk 936, it should be appreciated by those skilled in the art that other types of computer readable media which can store data that is accessible by a computer, such as magnetic cassettes, flash memory cards, digital video disks, random access memories, read only memories, and the like, may also be used in the exemplary operating environment.

A number of program modules may be stored on the hard disk, external disk 936, ROM 930 or RAM 928, including an operating system (not shown), one or more application programs 944, other program modules (not shown), and program data 946. The application programs may include at least a part of the functionality as depicted in FIGS. 1, 2, 3A, and/or 3B.

A user may enter commands and information, as discussed below, into the personal computer 920 through input devices such as keyboard 948 and mouse 950. Other input devices (not shown) may include a microphone (or other sensors), joystick, game pad, scanner, or the like. These and other input devices may be connected to the processing unit 922 through a serial port interface 952 that is coupled to the system bus 926, or may be collected by other interfaces, such as a parallel port interface 954, game port or a universal serial bus (USB). Further, information may be printed using printer 956. The printer 956 and other parallel input/output devices may be connected to the processing unit 922 through parallel port interface 954. A monitor 958 or other type of display device is also connected to the system bus 926 via an interface, such as a video input/output 960. In addition to the monitor, computing environment 920 may include other peripheral output devices (not shown), such as speakers or other audible output.

The computing environment 920 may communicate with other electronic devices such as a computer, telephone (wired or wireless), personal digital assistant, television, or the like. To communicate, the computer environment 920 may operate in a networked environment using connections to one or more electronic devices. FIG. 4 depicts the computer environment networked with remote computer 962. The remote computer 962 may be another computing environment such as a server, a router, a network PC, a peer device or other common network node, and may include many or all of the elements described above relative to the computing environment 920. The logical connections depicted in FIG. 4 include a local area network (LAN) 964 and a wide area network (WAN) 966. Such networking environments are commonplace in offices, enterprise-wide computer networks, intranets and the Internet and may particularly be encrypted.

When used in a LAN networking environment, the computing environment 920 may be connected to the LAN 964 through a network I/O 968. When used in a WAN networking environment, the computing environment 920 may include a modem 970 or other means for establishing communications over the WAN 966. The modem 970, which may be internal or external to computing environment 920, is connected to the system bus 926 via the serial port interface 952. In a networked environment, program modules depicted relative to the computing environment 920, or portions thereof, may be stored in a remote memory storage device resident on or accessible to remote computer 962. Furthermore other data relevant to the method for optimization of evaluation of a policy (described above) may be resident on or accessible via the remote computer 962. It will be appreciated that the network connections shown are exemplary and other means of establishing a communications link between the electronic devices may be used.

The above-described computing system is only one example of the type of computing system that may be used to implement the method for natural language-based control of a digital network.

LIST OF REFERENCE NUMERALS

- 10 user
- A1-A16 method steps in the framework operating in active mode
- P1-P14 method steps in the framework operating in passive mode
- 12 user request
- 14 verbal information
- 16 non-verbal information
- 100 client
- 110 communication and orchestration component
- 120 voice recording component
- 130 text-to-speech component
- 140 module management component
- 150 home knowledge component
- 160 action planning component
- 170 graphical user interface (GUI)
- 200 server
- 210 communication and orchestration component
- 220 voice identification component
- 230 speech emotion recognition component
- 240 automatic speech recognition component
- 250 semantic component
- 300a, 300b 300c, 300d, 300e, 300f bundle
- 400 digital network
- 500 network (e.g. Internet)
- 920 conventional computing environment
- 922 processing unit
- 924 system memory
- 926 system bus
- 928 random access memory (RAM)
- 930 read only memory (ROM)
- 932 hard disk drive
- 934 external disk drive
- 936 removable disk
- 938 hard disk drive interface
- 940 external disk drive interface
- 944 one or more application programs
- 946 program data
- 948 keyboard
- 950 mouse
- 952 serial port interface
- 954 parallel port interface
- 956 printer
- 958 monitor
- 960 video input/output
- 962 remote computer
- 964 local area network (LAN)
- 966 wide area network (WAN)
- 968 network I/O
- 970 a modem

What is claimed is:

1. A method comprising:

providing, by one or more processors of a client device and for display, a unified natural language interface;

receiving, by the one or more processors and using the unified natural language interface, a mode selection comprising one of an active mode or a passive mode;

selectively operating, by the one or more processors, in the one of the active mode or the passive mode based on the mode selection, the one of the active mode or the passive mode being used to receive an instruction for performing a device action, the active mode occurring prior to receiving the instruction for performing the device action, and when the mode selection identifies the active mode, the passive mode occurring prior to receiving the instruction for performing the device action, and when the mode selection identifies the passive mode, when operated in the active mode, the unified natural language interface being operable to interpret verbal information from a user input, and to control at least one device based on the verbal information interpreted from the user input, and when operated in the passive mode, the unified natural language interface being operable to continuously listen for a user request, to extract non-verbal information and verbal information from the user request, and to control the at least one device based on the non-verbal information and the verbal information extracted from the user request;

receiving, by the one or more processors, the instruction for performing the device action;
transmitting, by the one or more processors, based on selectively operating in the one of the active mode or the passive mode, and using a network, information based on the mode selection and the instruction for performing the device action to a server device,
the network being operable to provide communication between the client device, the server device, and a plurality of devices,
each of the plurality of devices being capable of performing a particular device action based on receiving a particular instruction from the client device,
the client device processing the mode selection of the active mode by performing a first set of communications,
the server device processing the mode selection of the active mode by performing a second set of communications,
the client device processing the mode selection of the passive mode by performing a third set of communications,
the third set of communications being different than the first set of communications, and
the server device processing the mode selection of the passive mode by performing a fourth set of communications,
the fourth set of communications being different than the second set of communications;
receiving, by the one or more processors and based on transmitting the information regarding the mode selection, response information from the server device; and
instructing, by the one or more processors and based on receiving the response information from the server device, a device, of the plurality of devices, to perform the device action.

2. The method of claim 1, further comprising:
receiving a verbal request from a user;
formatting the verbal request into speech signal information; and
transmitting the speech signal information.

3. The method of claim 1, further comprising:
selecting the device, of the plurality of devices, based on analyzing a list of tags included in the response information.

4. The method of claim 1, further comprising:
providing, based on instructing the device to perform the device action, an audio message indicating a result of the device action.

5. A non-transitory computer-readable medium storing instructions, the instructions comprising:
one or more instructions which, when executed by one or more processors of a client device, cause the one or more processors to:
provide, for display, a unified natural language interface;
receive, using the unified natural language interface, a mode selection comprising of one of an active mode or a passive mode;
selectively operate in the one of the active mode or the passive mode based on the mode selection,
the one of the active mode or the passive mode being used to receive an instruction for performing a device action,
the active mode occurring prior to receipt of the instruction for performing the device action, and when the mode selection identifies the active mode,
the passive mode occurring prior to receipt of the instruction for performing the device action, and when the mode selection identifies the passive mode,
when operated in the active mode, the unified natural language interface being operable to interpret verbal information, from a user input, and to control at least one device based on the verbal information interpreted from the user input, and
when operated in the passive mode, the unified natural language interface being operable to continuously listen for a user request, to extract non-verbal information and verbal information from the user request, and to control the at least one device based on the non-verbal information and the verbal information extracted from the user request;
receive the instruction for performing the device action;
transmit, based on selectively operating in the one of the active mode or the passive mode, and using a network, information based on the mode selection and the instruction for performing the device action to a server device,
the network being operable to provide communication between the client device, the server device, and a plurality of devices,
each of the plurality of devices being capable of performing a particular device action based on receiving a particular instruction from the client device,
the client device processing the mode selection of the active mode by performing a first set of communications,
the server device processing the mode selection of the active mode by performing a second set of communications,
the client device processing the mode selection of the passive mode by performing a third set of communications,
the third set of communications being different than the first set of communications, and
the server device processing the mode selection of the passive mode by performing a fourth set of communications,
the fourth set of communications being different than the second set of communications;
receive, based on transmitting the information regarding the mode selection, response information from the server device; and
instruct, based on receiving the response information from the server device, a device, of the plurality of devices, to perform the device action.

6. The non-transitory computer-readable medium of claim 5, where the instructions further include:
one or more instructions which, when executed by the one or more processors, cause the one or more processors to:
receive a verbal request from a user; and
format the verbal request into speech signal information; and
transmit the speech signal information.

7. The non-transitory computer-readable medium of claim 5, where the instructions further include:

one or more instructions which, when executed by the one or more processors, cause the one or more processors to:
  select the device, of the plurality of devices, based on analyzing a list of tags included in the response information.

8. The non-transitory computer-readable medium of claim 5, where the instructions further include:
one or more instructions which, when executed by the one or more processors, cause the one or more processors to:
  provide, based on instructing the device to perform the device action, an audio message indicating a result of the device action.

9. A client device comprising:
a memory to store instructions; and
a processor to execute the instructions to:
  provide, for display, a unified natural language interface;
  receive, using the unified natural language interface, a mode selection comprising one of an active mode or a passive mode;
  selectively operate in the one of the active mode or the passive mode based on the mode selection,
    the one of the active mode or the passive mode being used to receive an instruction for performing a device action,
    the active mode occurring prior to receipt of the instruction for performing the device action, and when the mode selection identifies the active mode,
    the passive mode occurring prior to receipt of the instruction for performing the device action, and when the mode selection identifies the passive mode,
    when operated in the active mode, the unified natural language interface being operable to interpret verbal information, from a user input, and to control at least one device based on the verbal information interpreted from the user input, and
    when operated in the passive mode, the unified natural language interface being operable to continuously listen for a user request, extract non-verbal information and verbal information from the user request, and to control the at least one device based on the non-verbal information and the verbal information extracted from the user request;
  receive the instruction for performing the device action;
  transmit, based on selectively operating in the one of the active mode or the passive mode, and using a network, information based on the mode selection and the instruction for performing the device action to a server device,
    the network being operable to provide communication between the client device, the server device, and a plurality of devices,
      each of the plurality of devices being capable of performing a particular device action based on receiving a particular instruction from the client device,
    the client device processing the mode selection of the active mode by performing a first set of communications,
    the server device processing the mode selection of the active mode by performing a second set of communications,
    the client device processing the mode selection of the passive mode by performing a third set of communications,
      the third set of communications being different than the first set of communications, and
    the server device processing the mode selection of the passive mode by performing a fourth set of communications,
      the fourth set of communications being different than the second set of communications;
  receive, based on transmitting the information regarding the mode selection, response information from the server device; and
  instruct, based on receiving the response information from the server device, a device, of the plurality of devices, to perform the device action.

10. The client device of claim 9, where the processor is further to:
receive a verbal request from a user;
format the verbal request into speech signal information; and
transmit the speech signal information.

11. The client device of claim 9, where the processor is further to:
select the device, of the plurality of devices, based on analyzing a list of tags included in the response information.

12. The client device of claim 9, where the processor is further to:
provide, based on instructing the device to perform the device action, an audio message indicating a result of the device action.

13. A method comprising:
receiving, by a server device, from a client device, and using a network, information based on a mode selection comprising one of an active mode or a passive mode;
  the client device selectively operating in the one of the active mode or the passive mode based on the mode selection,
    the one of the active mode or the passive mode being used to receive an instruction for performing a device action,
    the client device operating in the active mode prior to receiving the instruction for performing the device action, and when the mode selection identifies the active mode,
    the client device operating in the passive mode prior to receiving the instruction for performing the device action, and when the mode selection identifies the passive mode,
    when operated in the active mode, the client device being operable to interpret verbal information from a user input, and to control at least one device based on the verbal information interpreted from the user input, and
    when operated in the passive mode, the client device being operable to continuously listen for a user request, extract non-verbal information and verbal information from the user request, and to control the at least one device based on the non-verbal information and the verbal information extracted from the user request;
receiving, by the server device and based on the client device selectively operating in the one of the active mode or the passive mode, information based on the mode selection and the instruction for performing the device action,
  the network being operable to provide communication between the client device, the server device, and a plurality of devices, each of the plurality of devices being capable of performing a device action based on receiving an instruction from the client device, the client device processing the mode selection of the active mode by performing
a first set of communications,
processing, by the server device, the mode selection of the active mode by performing a second set of communications,
the client device processing the mode selection of the passive mode by performing a third set of communications,
the third set of communications being different than the first set of communications,
processing, by the server device, the mode selection of the passive mode by performing a fourth set of communications,
the fourth set of communications being different than the second set of communications; and
transmitting, by the server device and based on receiving the information regarding the mode selection and the instruction for performing the device action, response information to the client device,
the response information being used by the client device to instruct a device, of the plurality of devices, to perform the device action.

14. The method of claim 13, further comprising:
identifying, based on receiving the information based on the mode selection and the instruction for performing the device action, user information,
the user information being identified based on speech information associated with the instruction for performing the device action.

15. The method of claim 14, further comprising:
generating, based on the speech information, text information;
generating, based on the text information, one or more tags; and
transmitting the one or more tags to the client device.

16. The method of claim 15, further comprising:
using sematic information to parse the instruction for performing the device action into one or more text strings; and
generating the one or more tags based on the one or more text strings.

17. A server device comprising:
a memory to store instructions; and
a processor to execute the instructions to:
receive, from a client device, and using a network, information based on a mode selection comprising one of an active mode or a passive mode;
the client device selectively operating in the one of the active mode or the passive mode based on the mode selection,
the one of the active mode or the passive mode being used to receive an instruction for performing a device action,
the client device operating in the active mode prior to receipt of the instruction for performing the device action, and when the mode selection identifies the active mode,
the client device operating in the passive mode prior to receipt of the instruction for performing the device action, and when the mode selection identifies the passive mode,
when operated in the active mode, the client device being operable to interpret verbal information from a user input, and to control at least one device based on the verbal information interpreted from the user input, and
when operated in the passive mode, the client device being operable to continuously listen for a user request, to extract non-verbal information and verbal information from the user request, and to control the at least one device based on the non-verbal information and the verbal information extracted from the user request;
receive, based on the client device selectively operating in the one of the active mode or the passive mode, and using a network, information based on the mode selection and the instruction for performing the device action,
the network being operable to provide communication between the client device, the server device, and a plurality of devices,
each of the plurality of devices being capable of performing a device action based on receiving an instruction from the client device,
the client device processing the mode selection of the active mode by performing a first set of communications,
process the mode selection of the active mode by performing a second set of communications,
the client device processing the mode selection of the passive mode by performing a third set of communications,
the third set of communications being different than the first set of communications, and
process the mode selection of the passive mode by performing a fourth set of communications,
the fourth set of communications being different than the second set of communications; and
transmit, based on receiving the information regarding the mode selection and the instruction for performing the device action, response information to the client device,
the response information being used by the client device to instruct a device, of the plurality of devices, to perform the device action.

18. The device of claim 17, where the processor is further to:
identify, based on receiving the information based on the mode selection and the instruction for performing the device action, user information,
the user information being identified based on speech information associated with the instruction for performing the device action.

19. The device of claim 18, where the processor is further to:
generate, based on the speech information, text information;
generate, based on the text information, one or more tags; and
transmit the one or more tags to the client device.

20. The device of claim 19, where the processor is further to:
use sematic information to parse the instruction for performing the device action into one or more text strings; and
generate the one or more tags based on the one or more text strings.

* * * * *